United States Patent
Lynch et al.

(10) Patent No.: US 7,130,842 B2
(45) Date of Patent: *Oct. 31, 2006

(54) METHOD AND APPARATUS FOR GENERATING ELECTRONIC DOCUMENT DEFINITIONS

(75) Inventors: Peter J. Lynch, Charlotte, NC (US); Brenda H. High, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 10/102,764

(22) Filed: Mar. 21, 2002

(65) Prior Publication Data

US 2003/0182271 A1 Sep. 25, 2003

(51) Int. Cl.
*G06F 17/30* (2006.01)

(52) U.S. Cl. .................. 707/3; 707/4; 707/1

(58) Field of Classification Search ........... 707/1–10, 707/100–104.1, 107; 706/47; 705/30, 26; 379/114.2

See application file for complete search history.

(56) References Cited

U.S. PATENT DOCUMENTS

| | | | |
|---|---|---|---|
| 6,067,414 A | 5/2000 | Wang et al. ............... 395/702 |
| 6,125,391 A | 9/2000 | Meltzer et al. ............ 709/223 |
| 6,253,366 B1 | 6/2001 | Mutschler, III ............ 717/1 |
| 6,263,332 B1 | 7/2001 | Nasr et al. ................ 707/5 |
| 6,279,015 B1 | 8/2001 | Fong et al. ................ 707/523 |
| 6,289,501 B1 | 9/2001 | Mutschler, III ............ 717/1 |
| 6,330,569 B1 | 12/2001 | Baisley et al. ............. 707/203 |
| 6,510,434 B1* | 1/2003 | Anderson et al. ........... 707/100 |
| 6,708,186 B1* | 3/2004 | Claborn et al. ............. 707/102 |
| 6,854,120 B1* | 2/2005 | Lo et al. .................... 719/311 |
| 2001/0032218 A1 | 10/2001 | Huang ........................ 707/513 |
| 2001/0047372 A1 | 11/2001 | Gorelik et al. ............. 707/514 |
| 2002/0002566 A1 | 1/2002 | Gajraj ........................ 707/513 |
| 2002/0010781 A1 | 1/2002 | Tuatini ....................... 709/227 |
| 2002/0013790 A1 | 1/2002 | Vandersluis ................ 707/514 |
| 2002/0069123 A1* | 6/2002 | Soderlind et al. ............ 705/26 |
| 2002/0156756 A1* | 10/2002 | Stanley et al. ............... 706/47 |
| 2002/0156792 A1* | 10/2002 | Gombocz et al. ........... 707/100 |
| 2003/0133552 A1* | 7/2003 | Pillai et al. ............... 379/114.2 |
| 2003/0172368 A1* | 9/2003 | Alumbaugh et al. ........ 717/106 |
| 2003/0197733 A1* | 10/2003 | Beauchamp et al. ........ 345/764 |

FOREIGN PATENT DOCUMENTS

| | | |
|---|---|---|
| CA | 2255017 | 5/2000 |
| EP | 1 037 151 | 9/2000 |
| EP | 1 122 652 | 8/2001 |
| KR | 2001067859 | 7/2001 |

OTHER PUBLICATIONS

M. Biscarrat, *XML@SAP,SAPAG*,<http://www.sap.com>, (2001).
*Ariba Buyer MQSeries Integration White Paper*, IBM Corp., <http://www-3.ibm.com/software/ts/mqseries/adapter/ws/library/ariba/whitepaper.html>, (Viewed Feb. 25, 2002).

(Continued)

Primary Examiner—Jeffrey Gaffin
Assistant Examiner—Neveen Abel-Jalil
(74) Attorney, Agent, or Firm—Akerman Senterfitt

(57) ABSTRACT

A method of automatically creating an electronic document definition can include querying an application using a meta data interface of the application to retrieve meta data describing at least one application specific object for interacting with the application. The meta data can be received responsive to the querying step. The meta data can be processed to determine an electronic document definition describing the at least one application specific object in accordance with the received meta data.

19 Claims, 2 Drawing Sheets

OTHER PUBLICATIONS

*Interface Repository (IFR) for Collaborative Business Scenarios*, SAP, <http://ifr.sap.com/home/Documents/ifr.htm>, (Viewed Feb. 13, 2002).

C. Ruey-Shun, et al., A Web-Based Data Extraction System for Supply Chain Management Using SAP R/3, *Proc. of IEEE Int. Conf. on Systems, Man and Cybernetics*, vol. 4, pp. 2557-2562, (Oct. 7-10, 2001).

*The XML Scorecard for 3Q00, Software Economics Letter*, vol. 9, No. 8, pp. 1-3, (Aug. 2000).

T. Dubernet, et al., *Base System Products-Product Data Management With Technological Variety, ComTec*, vol. 78, No. 4, pp. 28-32, (2000).

M. Aleksy, et al., *Interoperability of Java-Based Applications and SAP's Business Framework State of the Art and Esirable Developments, Proc. of Int. Symp. On Distributed Objects and Applications*, pp. 190-200, (1999).

D. Ritter, *XML: The Missing Link for B2B E-Commerce, Intelligent Enterprise*, vol. 2, No. 7, pp. 30-2-36-7, (May 11, 1999).

*Seeburger Receives Official SAP XML Certification for the BIS/SAP XML Interface*, <http://www.swwburger.com>, no date.

J. Schwartz, *SAP Embraces Java and XML, InternetWeek*, <http://www.internetweek.com/news1298/news121098-9.htm>, (Dec. 10, 1998).

Chopra, et al., *XML-EDI Application Architecture, Research Disclosure*, N. 450, Art. 92, p. 1722 (Oct. 2001).

Conversion of Final Form Data, Such as AFP, to XML, *Research Disclosure*, No. 444, Art. 208, p. 709, (Apr. 2001).

*bTalk—Web-Enabling SAP, Backsoft Corp.*, <http://www.btalk.com/ontent_btalkxml.cfm>, (Viewed Feb. 13, 2002).

Method and Program to Generate Abritrary XML from a Java Hash Table . . . , *Research Disclosure*, No. 440, Art. 132, (Dec. 10, 2000).

Program Using XML to Generate Programming Tools for A Complex Program . . . , *Research Disclosure*, No. 434, Art. 153, (Jun. 10, 2000).

\* cited by examiner

METHOD AND APPARATUS FOR GENERATING ELECTRONIC DOCUMENT DEFINITIONS

BACKGROUND OF THE INVENTION

1. Technical Field

The invention relates to the field of application integration, and more particularly, to the generation of components for integrating different enterprise level applications.

2. Description of the Related Art

Enterprise resource planning (ERP) systems typically are multi-module software applications which help organizations manage diverse aspects of their business such as product planning, parts purchasing, maintaining inventories, interacting with suppliers, providing customer service, and tracking orders. ERP systems further can manage financial and human resource aspects of a business. For example, Ariba, Inc. of Sunnyvale, Calif., provides a comprehensive business-to-business commerce platform which includes an electronic procurement application known as Ariba™ Buyer.

Presently, some conventional ERP systems exchange information as objects. The Ariba Buyer system, for example, utilizes Java objects for exchanging information with other applications or systems. Although this architecture can provide a robust platform for interaction among disparate applications and systems, conventional ERP system manufacturers typically utilize proprietary object based messaging formats within their ERP systems which are not common to other ERP systems. In consequence, a middleware messaging system often must translate one proprietary ERP system message format, whether an object, XML, or some other message format, to another proprietary ERP system message format. Further, the middleware messaging system often must translate the proprietary objects into an intermediate messaging format used by the middleware itself.

For example, MQSeries™ is a middleware business integration software package available from International Business Machines Corporation of Armonk, N.Y. MQSeries provides messaging infrastructure to facilitate interactions between different ERP systems or applications. Through its various software components, MQSeries can provide a communication mechanism between applications on different platforms.

Middleware systems utilize software components referred to as adapters for converting one message format to another. Products such as IBM's MQSeries Adapter Builder, for example, can generate adapters for translating ERP system objects into XML representations. To generate such an adapter, a document type definition (DTD) describing the particular interface to the ERP system must be imported into the adapter generation tool. Unfortunately, many ERP systems do not specify the proper format of an XML representation of the ERP system objects. For example, the Ariba Buyer system does not specify the format of an XML representation of an Ariba Buyer Java object. Such ERP systems do not describe specific interfaces, nor do the ERP systems provide DTDs which are associated with specific interfaces.

In consequence, the DTD must be manually generated so that it can be imported into the adapter builder tool. The manual creation of a DTD, however, introduces the possibility of human error into the creation of adapters. Additionally, the manual nature of the process requires additional time not only for creating the DTDs and adapters, but also for future modifications of the DTDs and adapters.

SUMMARY OF THE INVENTION

The present invention provides for the automatic generation of electronic document definitions for specifying interfaces to enterprise resource planning (ERP) systems and applications. In particular, the present invention can query an ERP system and/or application using an interface provided by the ERP system itself to obtain meta data describing the other various object interfaces of the ERP system. The meta data can be processed to determine an electronic document definition which describes a particular object interface to the ERP system. The electronic document definition can be an extensible markup language (XML) document type definition (DTD), an XML schema, or another markup language document such as a hypertext markup language (HTML) document.

One aspect of the present invention can include a method of automatically creating an electronic document definition. The method can include querying an application using a meta data interface of the application itself to retrieve meta data describing at least one application specific object for interacting with the application. The meta data can be received responsive to the querying step. The meta data then can be processed to determine an electronic document definition describing one or more application specific objects in accordance with the received meta data. For example, the electronic document definition can be specified as a markup language document, a document type definition, or an extensible markup language schema.

The processing step can include identifying at least one variant represented by the meta data. The variant can be defined by the application or can be at least one other variant being associated with a second application to be interfaced with the application.

The meta data can represent at least one variant; and the variant can represent at least one class. Each class further can represent at least one subclass. Accordingly, the processing step can include recursively identifying each variant, and representing the variant in the electronic document definition. Also, each class and subclass can be recursively identified and represented in the electronic document definition.

The electronic document definition can be specified as an inbound electronic document definition or an outbound electronic document definition. Accordingly, the processing step can include determining whether each class is to be represented by the inbound electronic document definition or the outbound electronic document definition, and generating the inbound or outbound electronic document definition respectively.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The present invention provides for the automatic generation of electronic document definitions for specifying interfaces to enterprise resource planning (ERP) systems and applications. In particular, the present invention can query an ERP system and/or application using an interface provided by the ERP system itself to obtain meta data describing the other various object interfaces of the ERP system. The meta data can be processed to determine an electronic document definition which describes a particular object interface to the ERP system. The electronic document definition can be an extensible markup language (XML) document type definition (DTD), an XML schema, or another markup language document such as a hypertext markup language (HTML) document.

Figure 1:
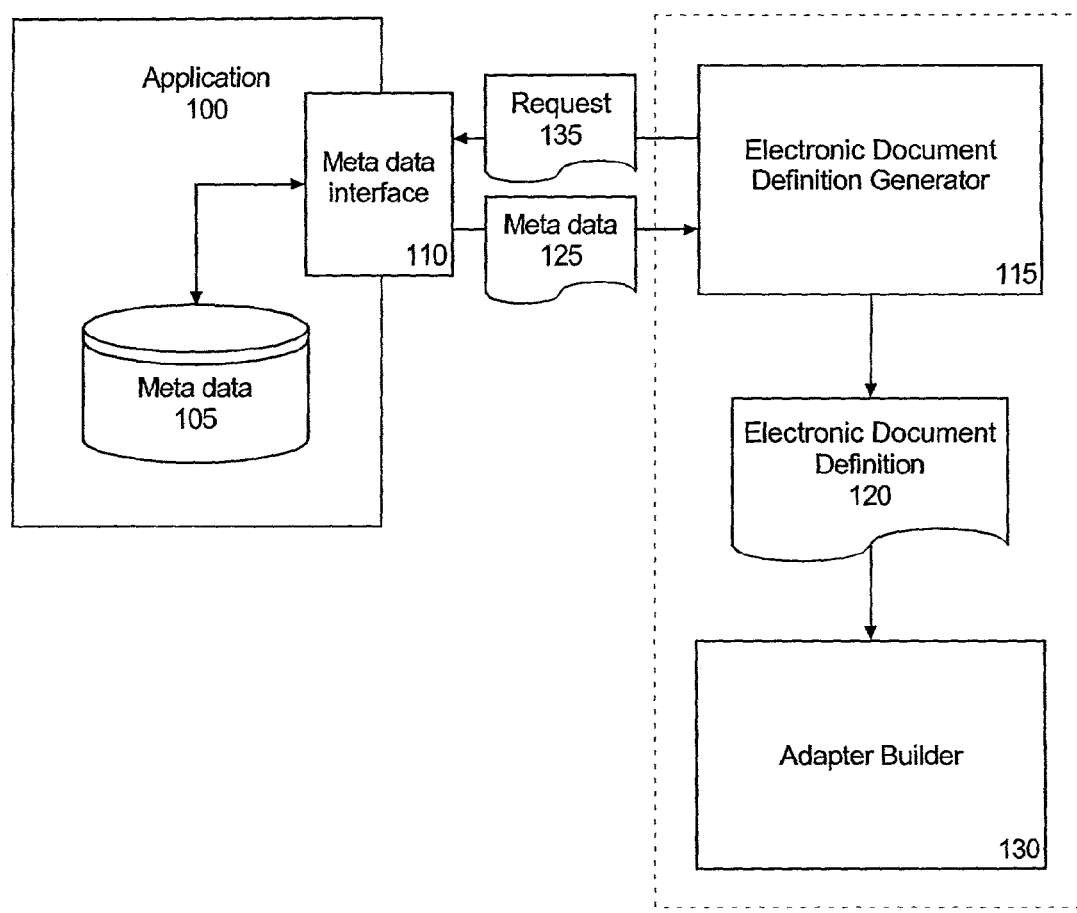
FIG. 1 is a schematic diagram illustrating a system for generating an electronic document definition in accordance with the inventive arrangements disclosed herein.

FIG. 1 is a schematic diagram illustrating a system for generating an electronic document definition in accordance with the inventive arrangements disclosed herein. As shown in FIG. 1, the system can include an application 100, an electronic document definition generator (generator) 115, as well as an adapter builder 130. As mentioned, the application 100 can be an ERP system such as the Ariba™ Buyer procurement system provided Ariba, Inc. of Sunnyvale, Calif.

The ERP system 100 can include a defined application programming interface (API) having a meta data interface 110 and a meta data repository 105. The meta data interface 110 provides external applications and tools with a means by which to access the meta data repository 105. The meta data repository 105 stores meta data which describes the objects of the ERP system 100. The objects, for example the Java objects used to interact with the Ariba Buyer procurement application, allow applications and systems to exchange information with the ERP system 100, as well as access various functions of the ERP system 100. The objects can be pre-defined objects which are included within the base ERP system 100, or alternatively, can be provided by a user of the ERP system 100. Regardless, the meta data within the meta data repository 105 describes the various objects of the ERP system 100. In particular, the meta data can describe the data structures, methods, titles, and different subsections, including individual inputs, outputs, as well as data values for the various objects of the ERP system 100.

The generator 115 can be configured to access the ERP system 100 meta data interface 110 to obtain meta data from the meta data repository 105. The generator 115 can issue a request 135 through the meta data interface 110 of the ERP system 100. The request 135 can specify meta data for one or more objects of the ERP system 100. Responsive to the request 135, the ERP system 100 can provide the requested meta data 125. The generator 115 can be configured to process the received meta data 125, and then generate one or more electronic document definitions 120. The resulting electronic document definitions 120, for example, can be XML DTDs, XML schema, or other markup language documents such as HTML documents. In any case, an electronic document definition can be generated for each object for which meta data was received. In consequence, the resulting electronic document definitions describe the interface objects to which the electronic document is associated.

The adapter builder 130 can be configured to generate adapters for the ERP system 100 objects. One example of such an adapter builder tool is the MQSeries Adapter Builder which is available from International Business Machines Corporation of Armonk, N.Y. The adapter builder 130 can import an electronic document definition 120 such as an XML DTD. From the electronic document definition 120, the adapter builder 130 can generate an adapter for communicating with the ERP system 100. Accordingly, the adapter can be used to communicatively link an application or ERP system 100 with a middleware application or system. Additional adapters can be included for processing other message formats thereby enabling the middleware to mediate between multiple applications and/or ERP systems. For example, the adapters can convert objects to other message formats including proprietary XML message formats and generalized XML message formats which are compliant with the business object definition structure (BOD) as promulgated by the Open Applications Group. Although the generator 115 and the adapter builder 130 are depicted as independent applications, those skilled in the art will recognize that the generator 115 and the adapter builder 130 can be included within a single larger tool for use in generating adapters for middleware systems.

Figure 2:
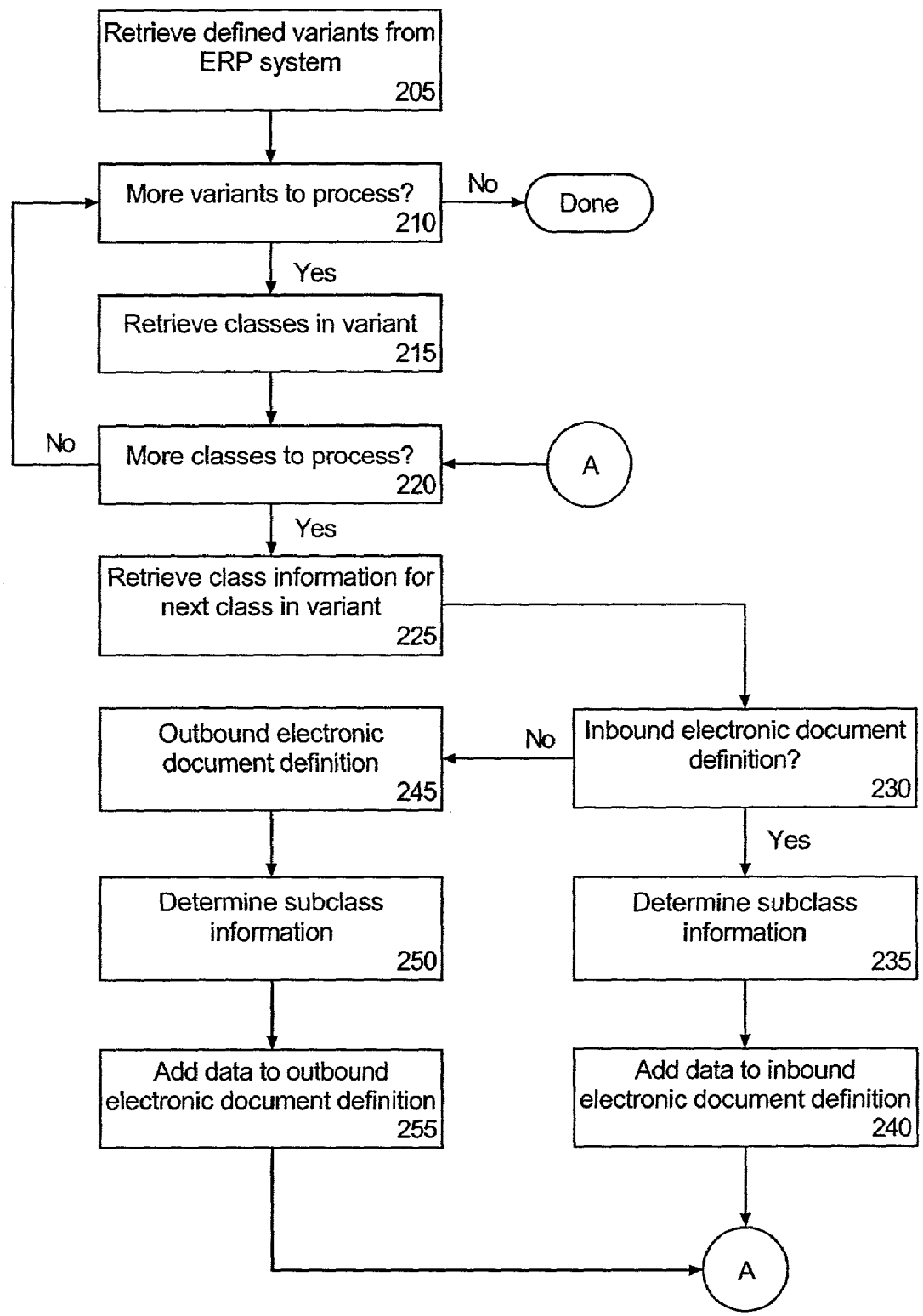
FIG. 2 is a flow chart illustrating a method of automatically generating an electronic document definition as performed by the system of FIG. 1.

FIG. 2 is a flow chart illustrating a method of automatically generating an electronic document definition as performed by the system of FIG. 1. The method of FIG. 2 can be used to develop electronic document definitions for use with the Ariba Buyer procurement application. Within an ERP system such as Ariba Buyer, meta data can be organized into objects referred to as variants. The ERP system can define a base variant for data used by the ERP system itself. In some cases, for the ERP system to interact with other applications, the ERP system may need to track additional information which is not used by the base ERP system. For example, if the ERP system is to interface with an accounting application, a variant specific to the accounting application can be defined within the ERP system. The accounting variant holds information that is extraneous to the ERP system, but is required for the accounting application to be interfaced with the ERP system.

A method for automatically generating an electronic document definition can begin in step 205. In step 205, the defined variants of the ERP system can be retrieved. As mentioned, the defined variants can include both the base variant utilized by the ERP system as well as any other variants to be used when interfacing the ERP system with other applications and/or systems. In step 210, a determination can be made as to whether additional variants are to be processed. If not, the method can end. If variants remain which have not been processed, however, the method can continue to step 215 where the classes of the variant currently being processed can be determined. As is known to those skilled in the art, the classes are defined by the ERP system and correspond to items such as the type of ERP system order, an address, a user, or any other component part of a transaction for which the ERP system is designed to process.

Proceeding to step 220, a determination can be made as to whether more classes are to be processed. If so, the method can continue to step 225 to begin processing the classes of the present variant. If all of the classes have been processed, the method can loop back to step 210 to process the next variant until all of the variants have been processed, at which time the method can end. Continuing with step 225, the class information for the next class in the variant being processed can be determined. By way of example, the class information can include, but is not limited to, permissions, roles which are specific to an ERP system implementation, and items such as a user's suppliers and other like information.

In step 230, a determination can be made as to whether the class being processed is inbound. Inbound classes are included within an inbound electronic document definition. The inbound electronic document definition describes objects being received by the ERP system. If the class is inbound, the method can continue to step 235 where the subclass information can be recursively determined for each subclass of the current class. After step 235, the method can continue to step 240 where the data determined thus far can be included within the inbound electronic document definition. After step 240, the method can continue to jump circle A to continue processing further classes of the present variant.

If the class was not determined to be inbound in step 230, the method can continue to step 245, where the class can be identified as an outbound class. Outbound classes are included within an outbound electronic document definition. The outbound electronic document definition specifies objects being provided by the ERP system. In that case, the method can continue to step 250 where the subclass information can be recursively determined for each subclass of the current class. In step 255, the determined data can be added to the outbound electronic document definition.

It should be appreciated by those skilled in the art that the method described herein can be recursively applied to the meta data until the meta data has been completely processed. As mentioned, the electronic document definitions can describe one or more interface objects of the ERP system. For example, for meta data describing a small number of interface objects, a single electronic document definition can be created which describes each of the interface objects. In cases where a large number of interface objects are described by the meta data, more than one electronic document definition can be created. In particular, if desired, one electronic document definition can be created per ERP system interface object. Accordingly, although the flow chart of FIG. 2 depicts the situation where data is continually added to a single outbound or inbound electronic document definition, it should be appreciated that a new inbound or outbound electronic document definition can be created for each interface object. Further, the data can be continually written to the electronic document definitions as depicted in FIG. 2, or can be temporarily stored and then written to one or more electronic document definitions upon completion of the meta data processing.

In any case, after processing the meta data and generating the inbound and outbound electronic document definitions, both electronic document definitions can be provided to one or more other tools such as XML editors, integrated development tools, or adapter builders for further processing. Electronic document definitions formatted in HTML can be used as user documentation.

The invention disclosed herein provides an automated method of determining electronic document definitions. By accessing the meta data interface of an application or ERP system, the meta data describing one or more particular ERP system interface objects can be retrieved. The methods described herein provide for a recursive approach to processing the meta data.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of automatically creating an electronic document definition comprising:

querying an application using a meta data interface of said application to retrieve meta data describing at least one application specific object to interact with said application, wherein said meta data represents at least one variant;

receiving said meta data responsive to said querying; and processing said meta data to automatically generate an electronic document definition describing said at least one application specific object in accordance with said received meta data, wherein the electronic document definition specifies a schema for a markup document, wherein said markup document is used by a middleware adaptor to convert messages between an application specific format and a different format specified by the adaptor, and wherein the step of processing said meta data comprises recursively identifying each said variant and representing said variant in said electronic document definition.

2. The method of claim 1, said processing step further comprising:

identifying at least one variant represented by said meta data, said variant being defined by said application.

3. The method of claim 2, said processing step further comprising:

identifying at least one other variant represented by said meta data, said other variant being associated with a second application to be interfaced with said application.

4. The method of claim 1, wherein said variant represents at least one class, said processing step further comprising:

recursively identifying each said class and representing said class in said electronic document definition.

5. The method of claim 4, wherein said electronic document definition comprises an inbound electronic document definition and an outbound electronic document definition, said processing step comprising:

determining whether each said class is to be represented by said inbound electronic document definition or said outbound electronic document definition; and generating said inbound electronic document definition and said outbound electronic document definition.

6. The method of claim 4, wherein said class represents at least one subclass, said processing step further comprising:

recursively identifying each said subclass and representing said subclass in said electronic document definition.

7. The method of claim 1, wherein the application format specified by the adaptor is another application specific format defined for another application and specified by another markup document having a schema based upon another electronic document definition.

8. The method of claim 1, wherein said electronic document definition is a document type definition.

9. The method of claim 1, wherein said electronic document definition is an extensible markup language schema.

10. A computer-readable storage medium, having stored thereon a computer program having a plurality of code sections when executed by a computer, performs the steps of:

querying an application using a meta data interface of said application to retrieve meta data describing at least one application specific object to interact with said application, wherein said meta data represents at least one variant;

receiving said meta data responsive to said querying; and processing said meta data to automatically generate an electronic document definition describing said at least one application specific object in accordance with said received meta data, wherein the electronic document definition specifies a schema for a markup document, wherein said markup document is used by a middleware adaptor to convert messages between an application specific format and a different format specified by the adaptor, and wherein the step of processing said meta data comprises recursively identifying each said class and representing, said class in said electronic document definition.

11. The machine-readable storage of claim 10, said processing step further comprising:

identifying at least one variant represented by said meta data, said variant being defined by said application.

12. The machine-readable storage of claim 11, said processing step further comprising:

identifying at least one other variant represented by said meta data, said other variant being associated with a second application to be interfaced with said application.

13. The machine-readable storage of claim 10, wherein said meta data represents at least one variant, said processing step further comprising:

recursively identifying each said variant and representing said variant in said electronic document definition.

14. The machine-readable storage of claim 10, wherein said variant represents at least one class, said processing step further comprising:

recursively identifying each said class and representing said class in said electronic document definition.

15. The machine-readable storage of claim 14, wherein said electronic document definition comprises an inbound electronic document definition and an outbound electronic document definition, said processing step comprising:

determining whether each said class is to be represented by said inbound electronic document definition or said outbound electronic document definition; and generating said inbound electronic document definition and said outbound electronic document definition.

16. The machine-readable storage of claim 14, wherein said class represents at least one subclass, said processing step further comprising:

recursively identifying each said subclass and representing said subclass in said electronic document definition.

17. The machine-readable storage of claim 10, wherein the application format specified by the adaptor is another application specific format defined for another application and specified by another markup document having a schema based upon another electronic document definition.

18. The machine-readable storage of claim 10, wherein said electronic document definition is a document type definition.

19. The machine-readable storage of claim 10, wherein said electronic document definition is an extensible markup language schema.

* * * * *